United States Patent [19]
Mori et al.

[11] Patent Number: 4,928,666
[45] Date of Patent: May 29, 1990

[54] CONTAINER FOR ACCOMMODATING A SOLAR RAY-COLLECTING DEVICE

[75] Inventors: Kei Mori, 3-16-3-501, Kaminoge, Setagaya-ku, Tokyo; Hakaru Akaishi, Osaka; Kenji Kakihara, Osaka; Yoshiro Kitayama, Osaka, all of Japan

[73] Assignee: Kei Mori, Tokyo, Japan

[21] Appl. No.: 246,566

[22] Filed: Sep. 19, 1988

[30] Foreign Application Priority Data

Sep. 28, 1987 [JP] Japan .................................. 62-243254

[51] Int. Cl.⁵ ................................................ F24J 2/08
[52] U.S. Cl. .................................... 126/440; 126/450; 52/200
[58] Field of Search ....................... 126/425, 440, 450; 52/72, 200

[56] References Cited

U.S. PATENT DOCUMENTS

| | | | |
|---|---|---|---|
| 3,307,303 | 3/1967 | Bloxsom | 52/200 |
| 3,521,414 | 7/1970 | Malissa | 52/200 |
| 4,589,400 | 5/1986 | Mori | 126/425 |

*Primary Examiner*—Carroll B. Dority
*Attorney, Agent, or Firm*—Jordan and Hamburg

[57] ABSTRACT

A container for accommodating a solar ray-collecting device comprises a cylindrical body and a transparent dome mounted on the body for accommodating therein the solar ray-collecting device. A fin for mounting the dome on the cylindrical body is unitarily attached to the lower opening end of the dome. The cylindrical body has therein a stand for carrying thereon the solar ray-collecting device. The lower end of the cylindrical body is cut off along the slanted surface of the roof.

3 Claims, 4 Drawing Sheets

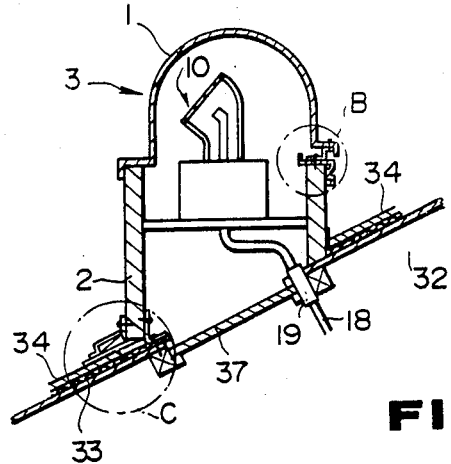
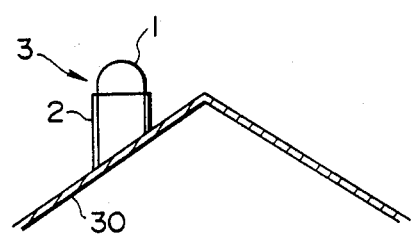
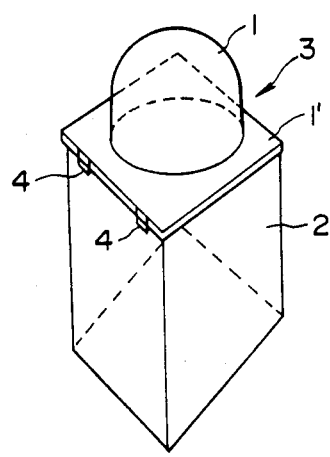
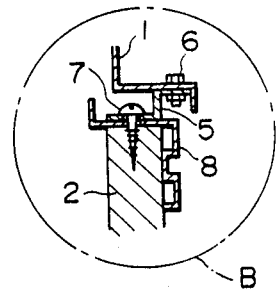

CONTAINER FOR ACCOMMODATING A SOLAR RAY-COLLECTING DEVICE

BACKGROUND OF THE INVENTION

The present invention relates to a container for accommodating a solar ray-collecting device, which is in particular, preferably employed in the case of installing said solar ray-collecting device same on an inclined roof.

A solar ray-collecting device previously proposed by the present applicant has a container for accommodating a solar ray-collecting device. The container is constructed of a head portion and a body. When employing the device, the solar ray-collecting device is accommodated in the container.

The solar ray-collecting device previously proposed by the applicant comprises a large number of lenses (for instance, seven lenses or nineteen lenses) for focusing the sun's rays, a sensor for sensing the direction of the sun, a support frame for unitarily supporting the lenses and the sensor, a first shaft for rotating the support frame, a first motor for rotating the first shaft, a support arm for supporting the lenses through the motor, a second shaft set perpendicularly to the first shaft, and a second motor for rotating the second shaft. The direction of the sun is sensed by the use of the sun-direction sensor, and its detection signal controls the first and second motors so as to always direct the lenses toward the sun. The solar rays focused by the lens are guided into optical conductor cable having a light-receiving end located at the focal position of the lens. The guided solar rays are transmitted through the optical conductor cable onto an optional desired place.

The sun's rays collected by use of the solar raycollecting device, are the light rays consisting of only visible white light ray components containing neither ultraviolet nor infrared rays. It is to be understood that such light rays are available for promoting the growth of animals or plants. Such light rays are especially effective for promoting a living body activity and for promoting the health of a human body without producing side effects, or for preventing the skin from the appearance of aging. Furthermore, the rays are effective for aiding in the recovery from illnesses such as gout, neuralgia, bedsores, rheumatism, burns, skin diseases, injuries, bone fractures, and so on, and for lessening the pain from such diseases.

Consequently, in case that the solar ray-collecting device, as mentioned above, is installed on the roof top of an ordinary family house and the solar rays, collected in such a manner as mentioned above, are guided through the optical conductor cable into a room, not only the interior of the room can be illuminated but in addition varieties of decorative plants and ornamental fish can be raised there. Furthermore, the collected solar rays can be employed for administering medical treatments for illnesses such as those mentioned above and promoting health and beauty.

However, the conventional solar ray-collecting device is constructed such that it is installed on a horizontal plane, and not constructed such that it is installed on an inclined roof of an individually-built house. On such an occasion, a stand having a horizontal plane is assembled on a roof's surface, and the solar ray-collecting device is installed on the horizontal surface thereof.

In the case of fixing the solar ray-collecting device on the stand in such a way, the stand vibrates by the action of wind pressure exerted onto the solar ray-collecting device, and consequently the calking gets displaced and rain gets into the device. In some cases the stand is placed directly on the colonial type tiling and firmly installed thereon by fixing a wire to the front of the house. Since the solar ray-collecting device is very heavy, the collar vest tends to break. A roof-piercing portion is employed for passing the optical conductor cable bringing the sun's rays collected by the solar raycollecting device into the room. A sleeve for protecting the roof-piercing portion of the optical conductor cable is employed.

In the afore-mentioned prior art, the optical conductor cable was inserted into the room through the roof-piercing portion. When the solar ray collecting device was vibrated by the action of the wind pressure or the like, the optical conductor cable vibrated also. Thereby, the calking was damaged and wind and rain leaked and infiltrated therefrom into the house.

SUMMARY OF THE INVENTION

It is an object of the invention to provide a container for accommodating a solar ray-collecting advice therein.

It is another object of the invention to provide a container for accommodating a solar ray-collecting device comprising a cylindrical body and a transparent dome mounted on the body for accommodating therein the solar ray-collecting device.

It is another object of the invention to provide a container for accommodating a solar ray-collecting device, preferably employed in the case of installing the solar ray-collecting device on an inclined roof.

BRIEF DESCRIPTION OF THE DRAWINGS

FIG. 6 is a cross-sectional construction view of the main part for explaining an embodiment of a container employed for accommodating a solar ray-collecting device according to the present invention;

FIG. 7 is an overall exterior view of the solar ray-collecting device installed on a roof according to the present invention;

FIG. 8 is an exterior view showing an embodiment of the container for accommodating the solar ray-collecting device according to the present invention;

FIG. 9 is a detailed view of the portion B shown in FIG. 6;

DESCRIPTION OF THE PREFERRED EMBODIMENTS

Figure 1:
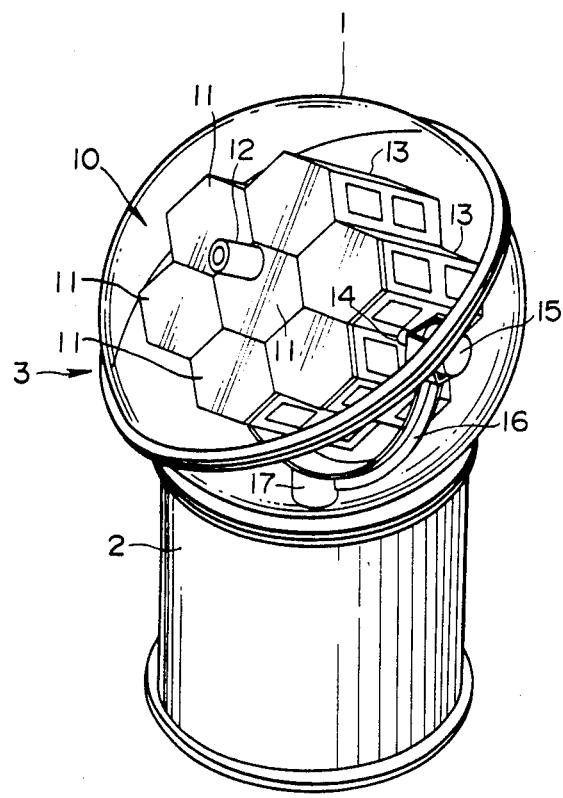
FIG. 1 is a perspective view for explaining an embodiment of the solar ray-collecting device previously proposed by the present applicant.

FIG. 1 is an overall perspective view showing an embodiment of the solar ray-collecting device previously proposed by the present applicant. In FIG. 1, the reference numeral 1 designates a transparent dome-shaped head portion and 2 a cylindrical body.

A container 3 for accommodating a solar ray-collecting device 10 is constructed of a head portion and a body. When employing the device, the solar ray-collecting device 10 is accommodated in the container 3 as shown in FIG. 1.

The solar ray-collecting device 10 comprises a large number of lenses 11 for focusing the sun's rays, a sensor 12 for sensing the direction of the sun, a support frame 13 for unitarily supporting the lenses 11 and the sensor 12, a first shaft 14 for rotating the support frame 13, a first motor 15 for rotating the first shaft 14, a support arm 16 for supporting the lenses 11 through the motor 15, a second shaft 17 set perpendicularly to the first shaft 14, and a second motor (not shown in FIG. 1) for rotating the second shaft 17. The direction of the sun is sensed by the use of the sun-direction sensor 12, and its detection signal controls the first and second motors so as to always direct the lenses 11 toward the sun. The solar rays focused by the lens 11 are guided into an optical conductor cable having a light-receiving end located at the focal position of the lens 11. The guided solar rays are transmitted through the optical conductor cable onto an optional desired place.

The sun's rays collected by use of the solar ray-collecting device, as mentioned above, are the light rays consisting of only visible white ray components containing neither ultraviolet nor infrared rays. It is to be understood that such light rays are available for promoting the growth of animals or plants. Such light rays are especially effective for promoting a living body activity and for promoting the health of a human body without producing side effects, or for preventing the skin from the appearance of aging. Furthermore, the rays are effective for aiding in the recovery from illnesses such as gout, neuralgia, bedsores, rheumatism, burns, skin diseases, injuries, bone fractures, and so on, and for lessening the pain from such diseases.

Consequently, in case that the solar ray-collecting device, as mentioned above, is installed on the roof top of an ordinary family house and the solar rays, collected in such a manner as mentioned above, are guided through the optical conductor cable into a room, not only the interior of the room can be illuminated but in addition varieties of decorative plants and ornamental fish can be raised there. Furthermore, the collected solar rays can be employed for administering medical treatments for illnesses such as those mentioned above and promoting health and beauty. The installation can be utilized for various purposes.

Figure 2:
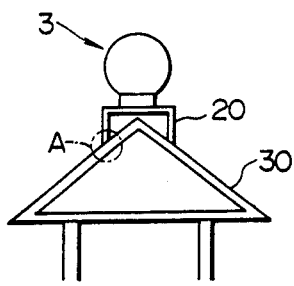
FIG. 2 is an outlined view for explaining an embodiment employed in the prior art solar ray-collecting device.

FIG. 2 is a view showing an embodiment of the prior art in the case of installing a solar ray-collecting device, as mentioned above, on the roof top of an ordinary family's house. In FIG. 2, the reference numeral 3 designates a container for accommodating the above-mentioned solar raycollecting device, 20 a stand for carrying thereon the container 3, and 30 the roof of a house. The conventional solar ray-collecting device is constructed such that it is installed on a horizontal plane as shown in FIG. 2. It is not constructed such that it is installed on an inclined roof of an individually-built house. On such an occasion, a stand 20 having a horizontal plane is assembled on a roof's surface, and the solar ray-collecting device is installed on the horizontal surface thereof.

Figure 3:
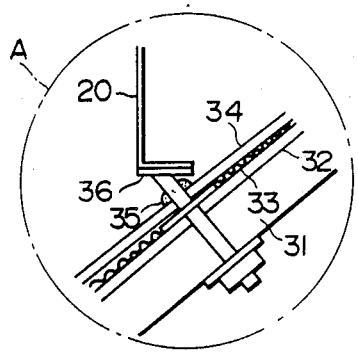
FIGS. 3 and 4 are, respectively, detailed views of the portion A shown in FIG. 2.

FIG. 3 is a detailed view for explaining an embodiment of the portion A shown in FIG. 2. In FIG. 3, the reference numeral 31 designates a house, 32 a sheathing board, 33 a roofing paper, 34 colonial-type tiling, 35 calking, and 36 a receptacle for receiving the stand 20. In the case of fixing the solar ray-collecting device 10 on the stand 20 in such a way, the stand 20 vibrates by the action of wind pressure exerted onto the solar ray-collecting device 10, and consequently the calking gets displaced and rain gets into the device 10. This is a problem to be solved.

Figure 4:
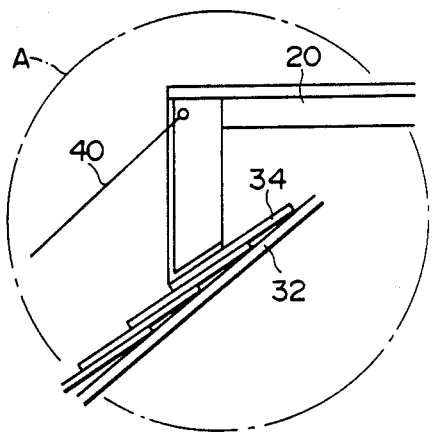

FIG. 4 is a detailed view for explaining another embodiment of the portion A shown in FIG. 2. In this embodiment, the stand 20 is placed directly on the colonial type tiling 34 and firmly installed thereon by fixing a wire 40 to the front of the house. In such a way, since the solar ray-collecting device is very heavy, the collar vest is broken. This is a problem to be solved.

Figure 5:
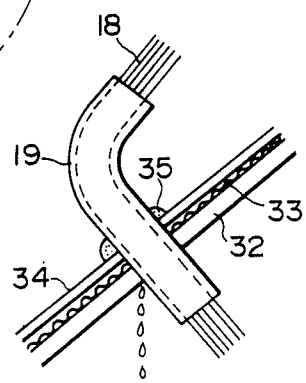
FIG. 5 is a detailed view for explaining the prior art in the case of inserting the optical conductor cable into the interior of the house.

FIG. 5 is a detailed view showing a roof-piercing portion employed for passing the optical conductor cable bringing the sun's rays collected by the solar ray-collecting device into the room. In FIG. 5, the reference numeral 18 designates an optical conductor cable (in the case of FIG. 5, a bundle of optic fibers), and 19 a sleeve for protecting the roof-piercing portion of the optical conductor cable.

In the afore-mentioned prior art, the optical conductor cable 18 was inserted into the room through the roof-piercing portion in the manner shown in FIG. 5. When the solar ray collecting device was vibrated by the action of the wind pressure or the like, the optical conductor cable vibrated also. Thereby, the calking 31 was damaged and wind and rain leaked and infiltrated therefrom into the house. This is a problem to be solved.

As mentioned above, conventionally, in the case of installing a solar ray-collecting device on the slanted roof of an ordinary house, a stand is assembled on the roof's surface and the solar ray-collecting device is installed thereon. For this reason, a roofing material, as for instance colonial-type tiling, is thereby broken and protection against rain cannot be assured. And further, such a construction has a defect in relation to the design for use in a residence. Furthermore, for inserting the optical conductor cable into the room and installing on the wall in the house, it is necessary to make a hole in the roof. However, there remains a draw back that the roof will not be rain-proof. It is the object of the present invention to eliminate the drawbacks of the prior art.

In order to attain the above-mentioned object, the present invention provides a container for accommodating the solar ray-collecting device comprising a cylindrical foundation and a transparent dome mounted on the body for accommodating therein the solar ray-collecting device, characterized in that a fin for mounting the dome on the cylindrical body is unitarily attached to the lower opening end of the dome, and the cylindrical body has a stand for carrying thereon the solar ray-collecting device in the interior of the dome and the lower end portion thereof is cut off along the slanted surface of the roof or has an opening-and-shutting check aperture. The present invention is described hereinafter according to the embodiments thereof.

FIG. 6 is a cross-sectional view of the main part for explaining an embodiment according to the present invention. FIG. 7 is an overall exterior view of the solar ray-collecting device installed on a slanted roof's surface as applied to the present invention.

In FIGS. 6 and 7, the reference numeral 3 designates a container for accommodating the solar ray-collecting device, and 30 the roof of a house. As mentioned before, the container of the solar ray-collecting device 10 is assembled by directly connecting the transparent dome 1 with the cylindrical body 2 carrying thereon the dome 1. The solar ray-collecting portion 3 is accommodated therein.

In the embodiment of the present invention, the lower end surface of the cylindrical body 2 is cut off at a slant along the incline of the roof. In such a way, it may be possible to fix the solar ray-collecting device directly onto the sloping plate 32 of the roof's surface. Moreover, in such a case, if the roof surface portion, corresponding to the lower end surface of the cylindrical body 2, is cut out and a transparent member 37 is fitted therein as shown in FIG. 6, the sun's rays can also be taken in through the formed skylight. Needless to mention, it is necessary to provide waterproofing means on the lower end portion of the cylindrical body 2.

FIG. 8 is an exterior view showing an embodiment of the container 3 for accommodating the solar ray-collecting portion 10 employed as part of the present invention. A fin portion 1' is unitarily attached to the lower end portion of the transparent dome 1, and this fin portion 1' is unitarily mounted onto the cylindrical portion 2 by use of a hinge 4 or the like. In such a construction as mentioned above, the dome portion 1 is opened and closed by turning it around the hinge 4 so that the solar ray-collecting device portion accommodated therein can be easily maintained and controlled.

FIG. 9 is a detailed view of the portion B shown in FIG. 6. The dome portion 1 and the cylindrical body portion 2 are combined with each other through a joint member 5 by use of a bolt 6, a wood screw 7, etc. On that occasion, a dew-drops receptacle 8 is interposed there-between at the same time and thereby introduction of moisture into the dome is prevented.

Figure 10:
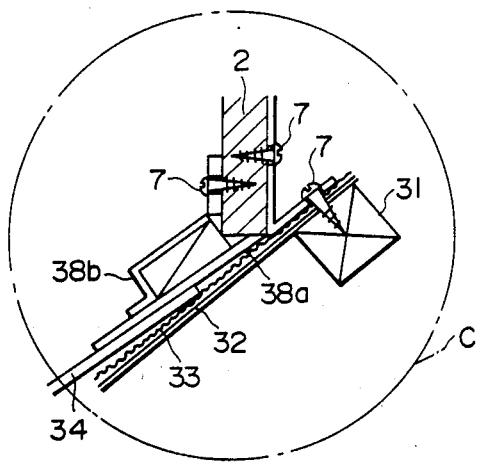
FIG. 10 is a detailed view of the portion C shown in FIG. 6.

FIG. 10 is a detailed view showing the portion C shown in FIG. 9. In FIG. 10, 38a is a throating for waste water and 38b is another throating for clean water. Thereby water damage can be avoided at the cylindrical body and on the roof.

Figure 11:
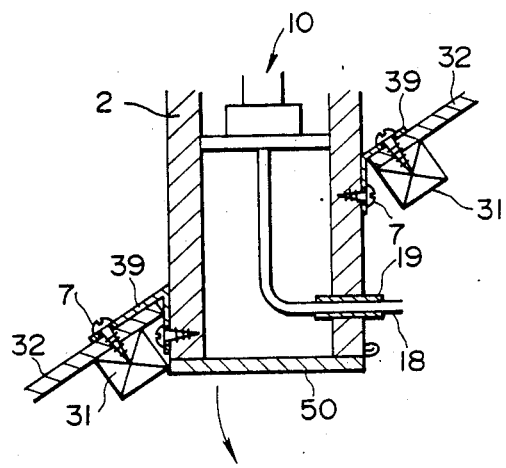
FIG. 11 is a cross-sectional view of the main part for explaining another embodiment of the present invention.

FIG. 11 is a cross-sectional construction view of the main part for explaining another embodiment of the present invention. In this embodiment, the lower end surface of the cylindrical portion 2 is formed not in the state of a slanted surface but in the state of a horizontal surface. The cylindrical portion 2 is inserted into the hole made in the roof and hangingly fixed to the hole by use of a fixing tool 39 commonly used as a throating. And further, the lower end surface of the cylindrical portion 2 is not formed in the state of a slanted surface. Instead, it is formed in the state of a horizontal surface. A bottom plate 50 is mounted thereon so as to open and close. Furthermore, the end portion of the cylindrical portion 2 has an aperture capable of being opened, and thereby the solar ray-collecting device can be checked through the aperture.

As is apparent from the foregoing description, according to the present invention, since it is not necessary to install the cylindrical body directly onto the roofing material (i.e. colonial-type tiling), there is no fear of damaging the roofing. Furthermore, since it is possible to use a countermeasure against rain-damage between the cylindrical body and the roof, the countermeasure can be surely applied. And further, there is no fear of experiencing a failure of the countermeasure against rain due to vibrations caused by the action of wind pressure or the like. Such matters are the merits of the present invention.

We claim:

1. A solar ray-collecting device mountable on a roof of a building in which said roof is inclined relative to horizontal, comprising a cylindrical body having a longitudinal axis and upper and lower longitudinal ends, a transparent dome, mounting means mounting said transparent dome on said upper longitudinal end of said cylindrical body, said mounting means comprising a flange extending from said transparent dome, a receptacle member on said upper longitudinal end of said cylindrical body, a joint member interposed between said flange and said receptacle member, first fastening means fastening said joint member to said flange, and second fastening means fastening said joint member and said receptacle member to said upper longitudinal end of said cylindrical body, solar ray-collecting means disposed within said transparent dome, said lower longitudinal end of said cylindrical body being disposed at an inclined angle relative to said longitudinal axis of said cylindrical body, said inclined angle corresponding to the incline of said inclined roof, securing means connected to said lower longitudinal end of said cylindrical body for securing said cylindrical body to said inclined roof such that said lower end of said cylindrical body is thereby mountable on said inclined roof with said longitudinal axis of said cylindrical body being disposed vertically upright, said solar ray-collecting means comprising an optical conductor cable means passing through said cylindrical body and extending through an opening in said roof to thereby conduct collected solar rays to the interior of said building.

2. The combination comprising a solar raycollecting device and an inclined roof structure of a building on which said solar ray-collecting device is mounted, said solar ray-collecting device comprising a cylindrical body having a longitudinal axis and upper and lower longitudinal ends, a transparent dome mounted on said upper longitudinal end of said cylindrical body, solar ray-collecting means disposed within said transparent dome, said lower longitudinal end of said cylindrical body being disposed at an inclined angle relative to said longitudinal axis of said cylindrical body, said inclined angle corresponding to the incline of said inclined roof structure, securing means connected to said lower longitudinal end of said cylindrical body and to said inclined roof structure for securing said cylindrical body to said inclined roof structure such that said lower longitudinal end of said cylindrical body is thereby mounted on said inclined roof structure with said longitudinal axis of said cylindrical body being disposed vertically upright, said roof structure having a first opening underlying said cylindrical body, a transparent means mounted in said first opening for passing solar rays to the interior of said building, said solar ray-collecting means comprising an optical conductor cable means passing through said cylindrical body, and a second opening in said inclined roof structure, said cable means extending through said second opening to thereby conduct collected solar rays to the interior of said building.

3. The combination according to claim 2, wherein said opening means through which said cable means extends underlies said cylindrical body.

* * * * *